(12) United States Patent
Lee et al.

(10) Patent No.: US 9,071,462 B2
(45) Date of Patent: Jun. 30, 2015

(54) METHOD AND APPARATUS FOR DISPLAYING MESSAGE IN MOBILE COMMUNICATION TERMINAL

(75) Inventors: Mi-Sun Lee, Gyeonggi-do (KR); Sung-Jo Oh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 758 days.

(21) Appl. No.: 13/306,078

(22) Filed: Nov. 29, 2011

(65) Prior Publication Data

US 2012/0157134 A1 Jun. 21, 2012

(30) Foreign Application Priority Data

Dec. 17, 2010 (KR) .................... 10-2010-0129803

(51) Int. Cl.
*H04W 4/00* (2009.01)
*H04M 1/725* (2006.01)
*G06K 9/46* (2006.01)
*H04L 12/58* (2006.01)

(52) U.S. Cl.
CPC ............ *H04L 12/583* (2013.01); *H04L 12/586* (2013.01); *H04L 12/5895* (2013.01); *H04L 51/063* (2013.01)

(58) Field of Classification Search
CPC ........... H04W 4/12; H04W 4/14; H04W 4/20; H04L 12/583; H04L 12/586; H04L 12/5895; H04L 51/063; H04L 51/16; G06F 17/211; G06F 17/27; G06F 17/2765; G06F 17/2785; G06F 17/30244; G06F 17/30265; G06F 17/30268; G06F 17/3079; G06F 17/30796

USPC ................ 455/412.1–412.2, 414.1, 418, 466; 704/9–10, 219, 262; 715/810–813, 715/816–817; 382/115–118, 190
See application file for complete search history.

(56) References Cited

U.S. PATENT DOCUMENTS

| | | | |
|---|---|---|---|
| 2003/0165270 A1* | 9/2003 | Endrikhovski et al. | 382/189 |
| 2005/0054287 A1* | 3/2005 | Kim | 455/3.05 |
| 2006/0041629 A1* | 2/2006 | Lira | 709/206 |
| 2007/0054679 A1* | 3/2007 | Cho et al. | 455/466 |
| 2007/0070181 A1* | 3/2007 | Oh et al. | 348/14.02 |
| 2007/0213082 A1* | 9/2007 | Ryu et al. | 455/466 |

FOREIGN PATENT DOCUMENTS

KR 10-2008-0034248 A 4/2008

* cited by examiner

*Primary Examiner* — Michael Mapa
(74) *Attorney, Agent, or Firm* — Cha & Reiter, LLC.

(57) ABSTRACT

A method for displaying a message in a mobile communication terminal in which includes: when a message is received (or transmitted), a keyword is extracted from received (or transmitted) message contents; a determination is made whether a counterpart's (or one's own) sender information of the received (or transmitted) message exists, wherein when the counterpart's (or one's own) sender information exists, a determination is made whether a representative photo image exists in the counterpart's (or one's own) sender information, and when the representative photo image exists, a face detection feature is extracted from the representative photo image, and a keyword is extracted from the received message contents, and wherein a photo image that meets at least one of the extracted face detection feature and the keyword is searched for from an internal device or an external device.

20 Claims, 16 Drawing Sheets

METHOD AND APPARATUS FOR DISPLAYING MESSAGE IN MOBILE COMMUNICATION TERMINAL

CLAIM OF PRIORITY

This application claims the benefit of priority under 35 U.S.C. §119 priority from Korean patent application filed in the Korean Intellectual Property Office on Dec. 17, 2010 and assigned Serial No. 10-2010-0129803, the entire disclosure of which is hereby incorporated by reference.

BACKGROUND OF THE INVENTION

1. Field of the Invention

The present invention relates to the field of mobile communication terminals. More particularly, the present invention relates to an apparatus and a method for dynamically displaying a message to a user.

2. Description of the Related Art

The mobile communication field has rapidly developed so rapidly that mobile communication terminals have become a necessity because of its convenience in portability and its convenience in communication.

The mobile communication terminal has a Short Message Service (SMS) function that may receive and transmit predetermined characters besides the general voice communication. An SMS is a message service that allows users of a mobile phone to transmit and receive short sentences of about 40 characters even without a separate additional equipment. Unlike an Electronic (E)-mail service, the SMS is advantageous as the message service transfers message content almost simultaneously with a transmission point. Thus, the SMS message service has established its position as one of the more favored means of communication.

Under this circumstance, the SMS has gradually improved but an overload is caused for meeting a user's desire. For example, FIG. 1 illustrates a conventional example that displays a history of short message reception/transmission with a counterpart. Referring to FIG. 1, the conventional art displays a history of transmitting and receiving an SMS message to/from a counterpart in the form of text primarily. This conventional display method has an advantage of showing a conversation between the parties at a glance. However, under a circumstance that gradually favors a dynamic User Interface (UI) such as animation, the conventional method has a disadvantage of not meeting a user's taste.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for dynamically displaying a message to a user.

Another aspect of the present invention is to provide a method and an apparatus for displaying a message, by displaying a message with an image related to parties transmitting and/or receiving a message as a background.

Still another aspect of the present invention is to provide a method and an apparatus for displaying a message, by displaying a message with a photo image related to contents of the message as a background.

Other aspects, advantages and salient features of the invention will become apparent to those skilled in the art from the following detailed description, which, taken in conjunction with the annexed drawings, discloses exemplary embodiments of the invention.

In accordance with an exemplary embodiment of the present invention, a method for displaying a message in a mobile communication terminal is provided. The method includes receiving (or transmitting) a message, extracting a keyword from received (or transmitted) message contents, determining whether the information of sender of the received message or the user of the transmitted message exists, determining whether a representative photo image exists in the sender's or the user of the transmitted message information, extracting a face detection feature from the representative photo image and extracting a keyword from the message contents when the representative photo image exists, searching for a photo image that meets at least one of the extracted face detection feature and the keyword from an internal device or an external device, and selecting one of searched photo images, and viewing a message history window where a message region on which text of the received (or transmitted) message is displayed with this selected photo image as a background image.

In accordance with another exemplary embodiment of the present invention, an apparatus for displaying a message in a mobile communication terminal is provided. The apparatus includes an input unit for an input, a storage for storing a received/transmitted message, a display unit for displaying the received/transmitted message stored in the storage, a communication unit for receiving/transmitting a short message, and a controller for searching for a photo image related to message contents, a recipient/sender, and then controlling to display text of the message with the searched photo image as a background image, wherein the controller receives (transmits) a message and then extracts a keyword from received (transmitted) message contents, extracts a face detection feature from a representative photo image of a counterpart's (or one's own) sender information of the received (or transmitted) message, searches for a photo image that meets at least one of the extracted face detection feature and the keyword from an internal device or an external device and then selects one photo image, and views a message history window where a message region on which text of the received (or transmitted) message is displayed with the selected photo image as a background is configured.

BRIEF DESCRIPTION OF THE DRAWINGS

The above and other exemplary aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the exemplary embodiments described herein may be made without departing from the spirit of the invention and the scope of the appended claims. Also, descriptions of well-known functions and constructions may be omitted for clarity and simplicity so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide.

Preferred exemplary embodiments of the present invention will be described below with reference to the accompanying drawings.

Exemplary embodiments of the present invention provide a method and an apparatus for displaying a message in a mobile communication terminal. More particularly, exemplary embodiments of the present invention provide a method and an apparatus for dynamically displaying an SMS message.

Figure 1:
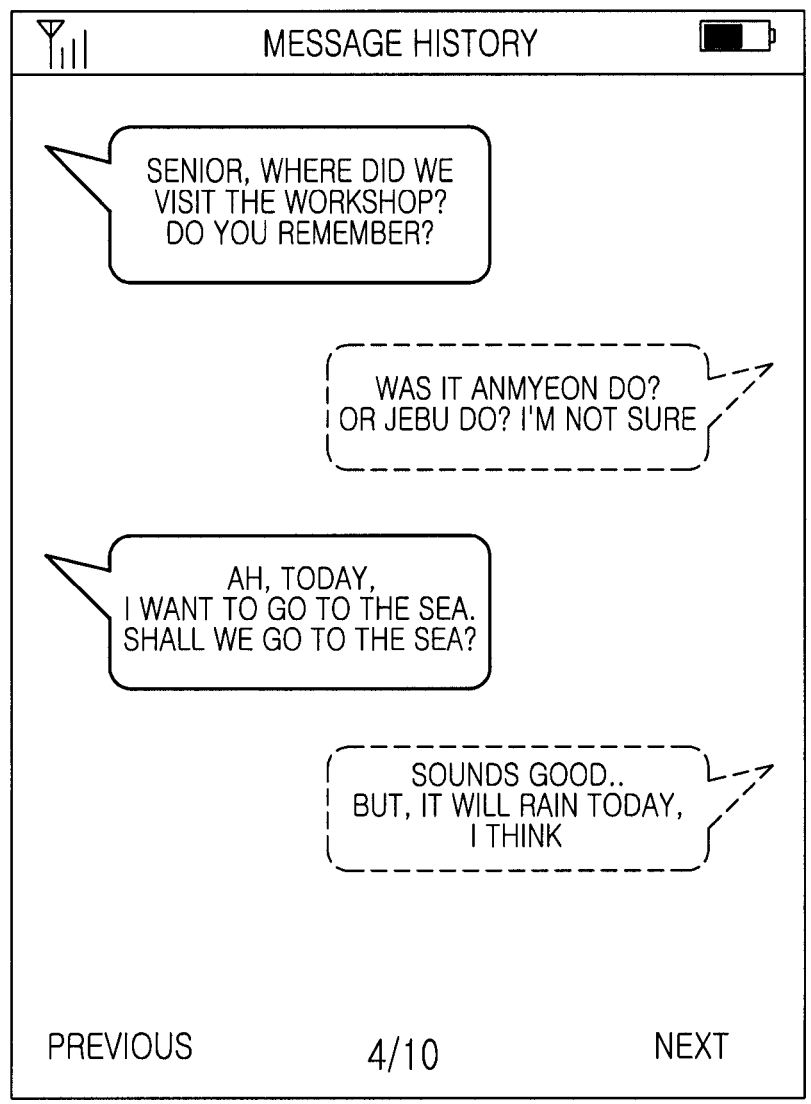
FIG. 1 is a view illustrating a conventional example of displaying a history of receiving/transmitting a short message with a counterpart user.
Figure 2:
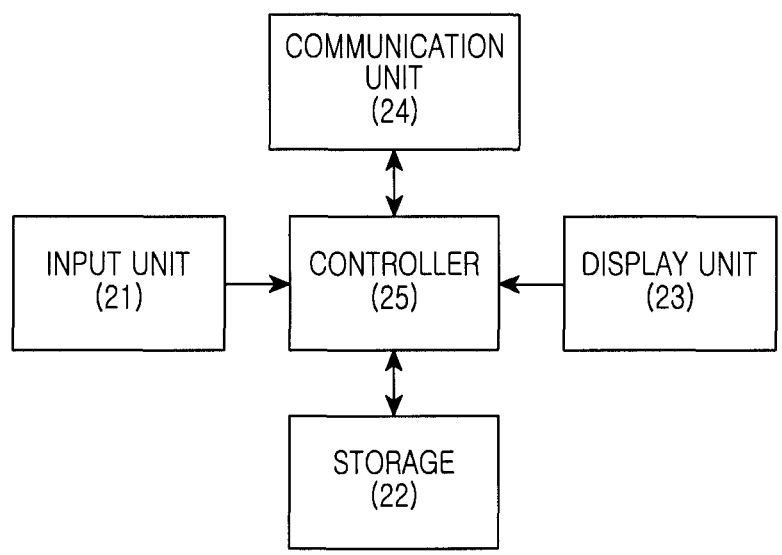
FIG. 2 is a block diagram illustrating a mobile communication terminal having a message display function according to an exemplary embodiment of the present invention.

FIG. 2 is a block diagram illustrating a mobile communication terminal having a message display function according to an exemplary embodiment of the present invention.

Referring to FIG. 2, the mobile communication terminal includes an input unit 21 having various function keys (not shown), a storage 22 for storing reception/transmission messages, a display unit 23 for displaying reception/transmission messages stored in the storage 22, a communication unit 24 for receiving/transmitting a short message, and a controller 25 for searching for message contents, a photo image related to a recipient/sender, and then controlling to display text of the message with the searched photo image as a background.

The input unit 21 has a plurality of numerical keys and function keys, and outputs a signal corresponding to the keys to the controller 25. Preferably, the input unit 21 may be in the form of a touch screen depending on the construction of the mobile communication terminal.

The storage 22 stores a predetermined program for controlling an overall operation of the mobile communication terminal and various data input/output when a control operation of the mobile communication terminal is performed. In addition, the storage 22 stores a phone book in which contact information has been registered. Preferably, the contact information denotes information where a name, a phone number, a photo and a character image symbolizing a counterpart, and an E-mail address of the counterpart are related and registered.

The display unit 23 receives display data corresponding to a key signal from the input unit 21 under control of the controller 25, and displays an operation state and various information of the mobile communication terminal in the form of an icon and a character.

The communication unit 24 performs communication with a base station, modulates a short message generated by the controller 25 as a Radio Frequency (RF) signal, and transmits the same to an external terminal via the base station, or demodulates a received short message as a baseband to output the same to the controller 25.

The controller 25 controls an overall operation of the mobile communication terminal. Hereinafter, a method for displaying a message by the controller 25 according to an exemplary embodiment of the present invention is described in more detail with reference to the accompanying drawings.

Figure 3A:
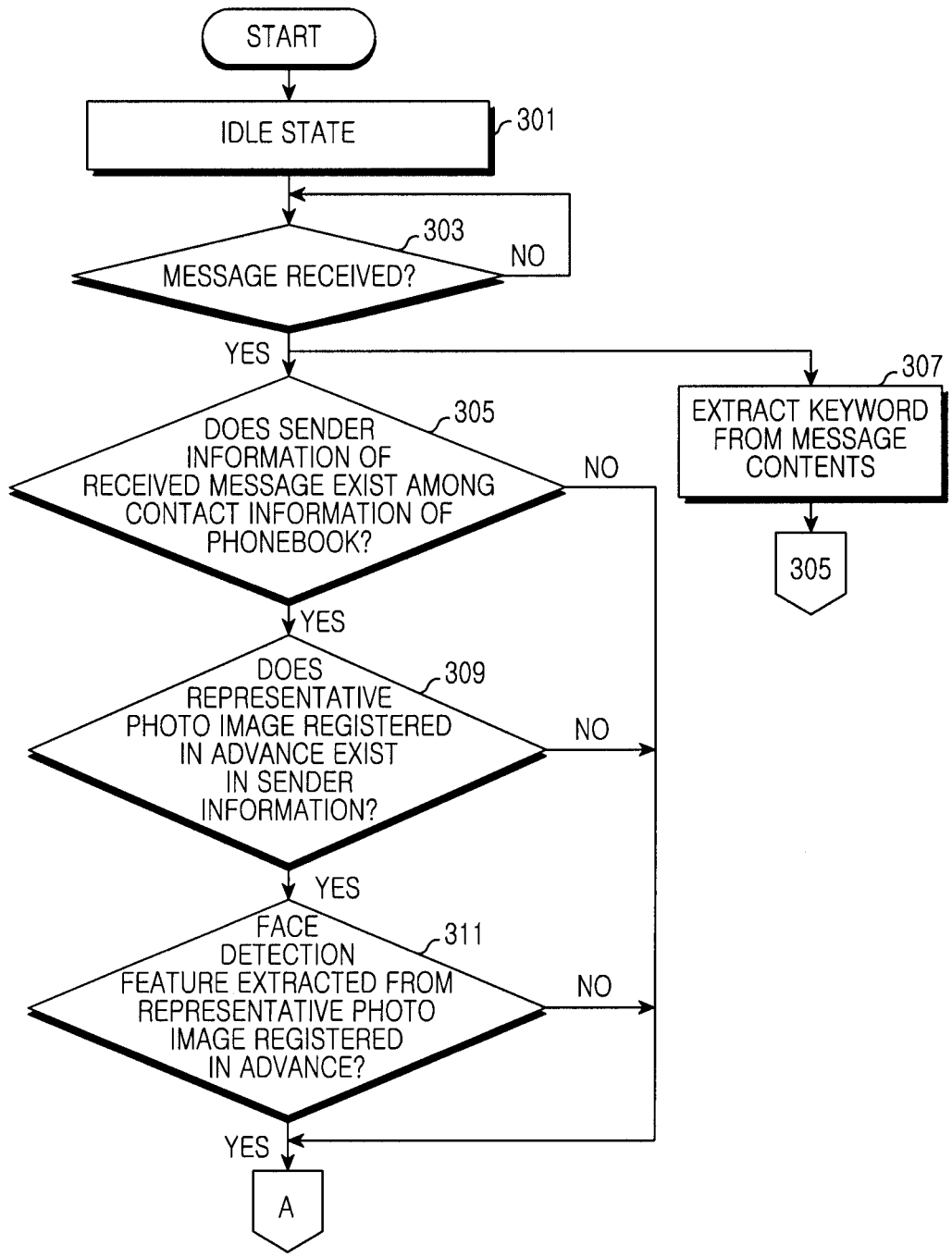
FIG. 3A is a flowchart illustrating a method for displaying a received message according to an exemplary embodiment of the present invention.

FIG. 3A is a flowchart illustrating a method for displaying a received message according to an exemplary embodiment of the present invention.

Referring to FIG. 3A, the controller 25 receives a message from the communication unit 24 in an idle state (step 301) in step 303.

The controller 25 determines whether sender information of the received message exists among contact information within a phone book provided to the storage 21 in step 305. Furthermore, the controller 25 extracts a keyword from received message contents in step 307. The keyword is a related word regarding a person's name, a place, a title, a behavior, weather, a location, etc. For example, 25 the keyword may be 'sea', 'Seoul', 'joy', 'travel', snow', etc.

When the sender information of the received message exists, the controller 25 determines whether a representative photo image registered in advance exists in the counterpart sender information in step 309. The representative photo image symbolizes the sender. For example, the 30 representative photo image may be a face photo image.

When the representative photo image of the counterpart exists, the controller 25 determines whether a face detection feature is extracted from the representative photo image of the counterpart in step 311. When the representative photo image is not a face photo image, the controller 25 may not extract the face detection feature.

When the face detection feature is extracted, the controller 25 searches for a photo image that meets at least one of the face detection feature and the keyword extracted in step 307 from an internal device or an external device in step 313. The controller 25 may search for relevant photo images from the internal device such as the storage 22. In addition, the controller 25 may search for the relevant photo images from the external device such as a network via the communication unit 24. The controller 25 may find a photo image corresponding to the face detection feature, and find information of a photo image, that is, a filename, image explanation, etc. to which the keyword belongs.

When the face detection feature is not extracted even if the representative photo image of the counterpart exists, the controller 25 searches for a photo image meeting the keyword extracted from message contents.

When determining that the relevant photo images are searched for in step 315, the controller 25 selects one of the searched photo images and views a message history window where a message region on which text of a received message is displayed. The s selected photo image is then used as a background in step 317. Here, the controller 25 may select, with priority, a photo image that meets both a face detection feature and a keyword from the searched photo images. In addition, when photo images that meet only one of the face detection feature and the keyword are searched, the controller 25 may select, with priority, a photo image that meets the face detection feature. Furthermore, the controller 25 may select the latest photo image from the searched photo images. More particularly, when a photo image meeting a condition is immediately found during a process of searching for the photo images, the controller 25 may stop the search operation. For example, when a photo image meeting both the face detection feature and the keyword is found, the controller 25 stops the search operation.

When determining that the relevant photo image is not searched for in step 315, the controller 25 allows a user to view the message history window where the message region on which text of a received message is displayed with a basic photo image as a background in step 319.

Figure 3B:
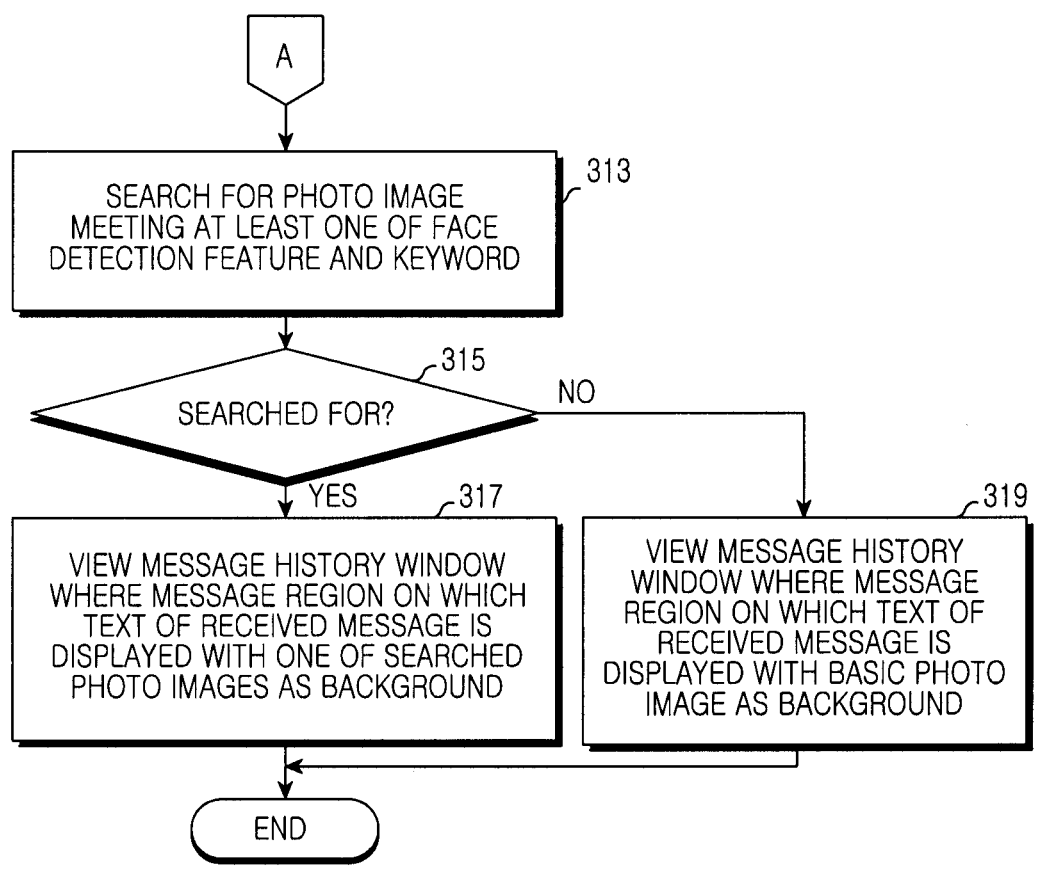
FIG. 3B is a flowchart illustrating a method for displaying a transmission message according to an exemplary embodiment of the present invention.
Figure 3C:
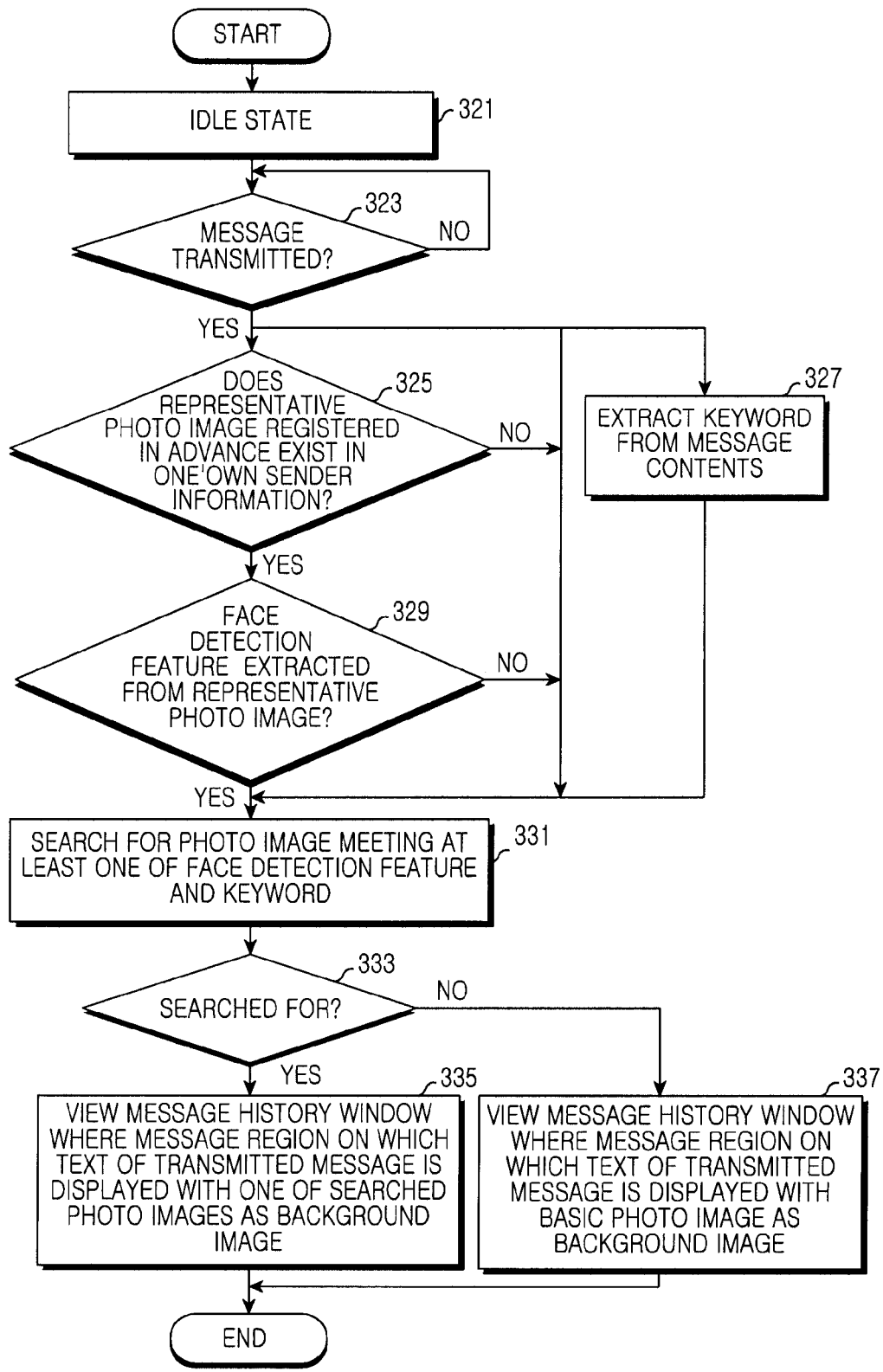

FIG. 3B is a flowchart illustrating a method for displaying a transmission message according to an exemplary embodiment of the present invention.

Referring to FIG. 3B, the controller 25 sends a calling message to the communication unit 24 in an idle state (step 321) in step 323.

The controller 25 determines whether a representative photo image, registered in advance, exists in one's own sender information provided to the storage 21 in step 325. The representative photo image symbolizes a user and may be a face photo image for example. Furthermore, the controller 25 extracts a keyword from calling message contents in step 327. The keyword is a word regarding a person's name, a place, a title, a behavior, weather, a location, etc. For example, the keyword may be 'sea', 'Seoul', 'joy', 'travel', snow', etc.

When one's own representative photo image exists, the controller 25 determines whether a face detection feature is extracted from one's own representative photo image in step 329. In the case where the representative photo image is not a face photo image, the controller 25 may not extract the face detection feature.

When the face detection feature is extracted, the controller 25 searches for a photo image that meets at least one of the face detection feature and the keyword extracted in step 327 from an internal device or an external device in step 331. The controller 25 may search for relevant photo images from the internal device such as the storage 22. In addition, the controller 25 may search for the relevant photo images from the external device such as a network via the communication unit 24. The controller 25 may find a photo image corresponding to the face detection feature, and associated information of a photo image, (i.e., a filename, image explanation, etc. to which the keyword belongs).

When the face detection feature is not extracted even if one's own representative photo image exists, the controller 25 searches for a photo image meeting the keyword extracted from message contents in step 331.

When determining that the relevant photo images are searched for in step 333, the controller 25 selects one of the searched photo images and views a message history window where a message region on which text of a calling message is displayed wherein this selected photo image is used as a background in step 335. Here, the controller 25 may select, with priority, a photo image that meets both a face detection feature and a keyword from the searched photo images. In addition, when photo images that meet only one of the face detection feature and the keyword are searched, the controller 25 may select, with priority, a photo image that meets the face detection feature. Furthermore, the controller 25 may select the latest photo image from the searched photo images. More particularly, when a photo image meeting a condition is immediately found during a process of searching for the photo images, the controller 25 may stop the search operation. For example, when a photo image meeting both the face detection feature and the keyword is found, the controller 25 stops the search operation.

When determining that the relevant photo image is not searched for in step 333, the controller 25 views the message history window where the message region on which text of a calling message is displayed with a basic photo image as a background in step 337.

Figure 4A:
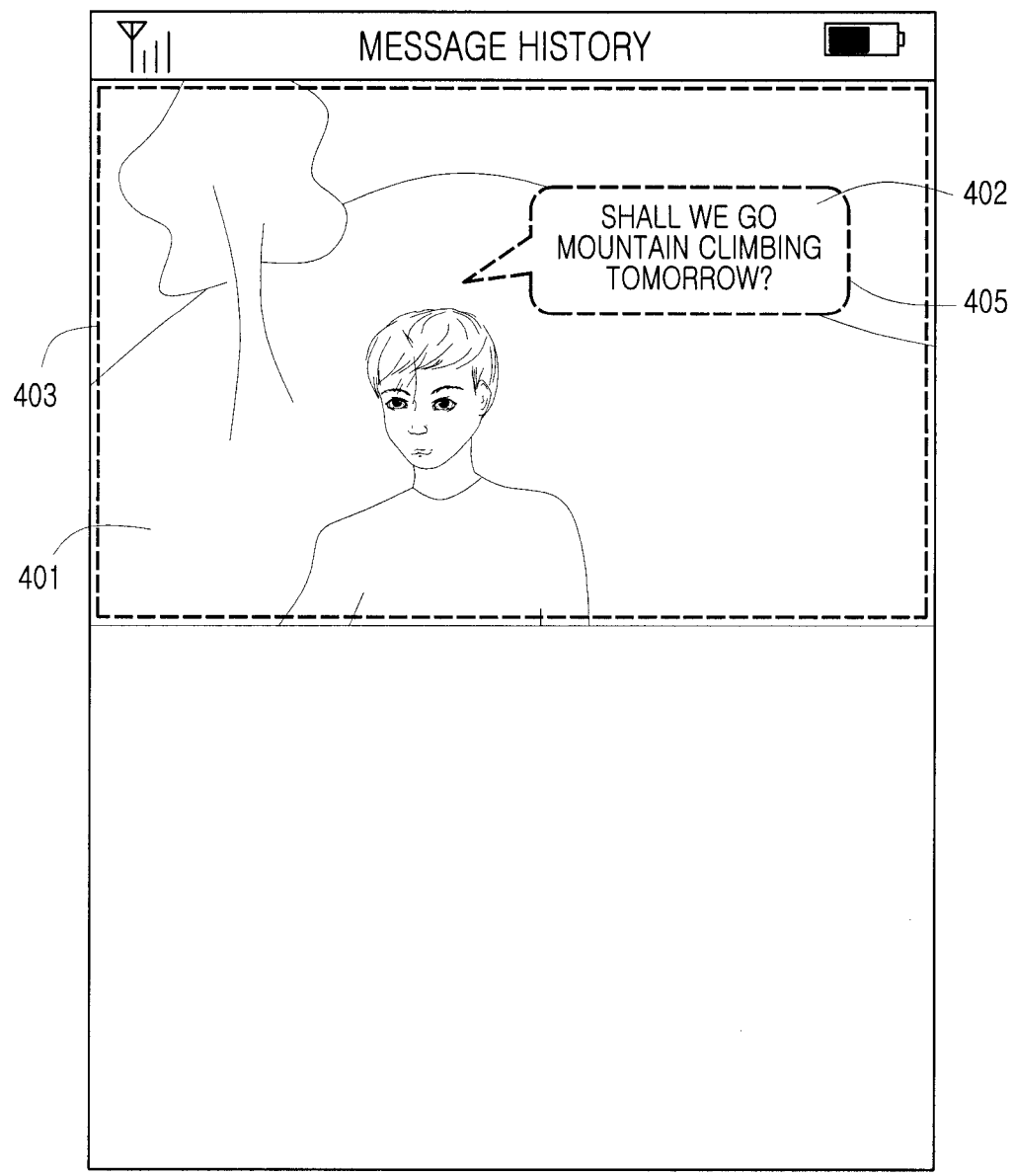
FIGS. 4A and 4B are views illustrating a screen of a mobile communication terminal where a message is displayed according to an exemplary embodiment of the present invention.
Figure 4B:
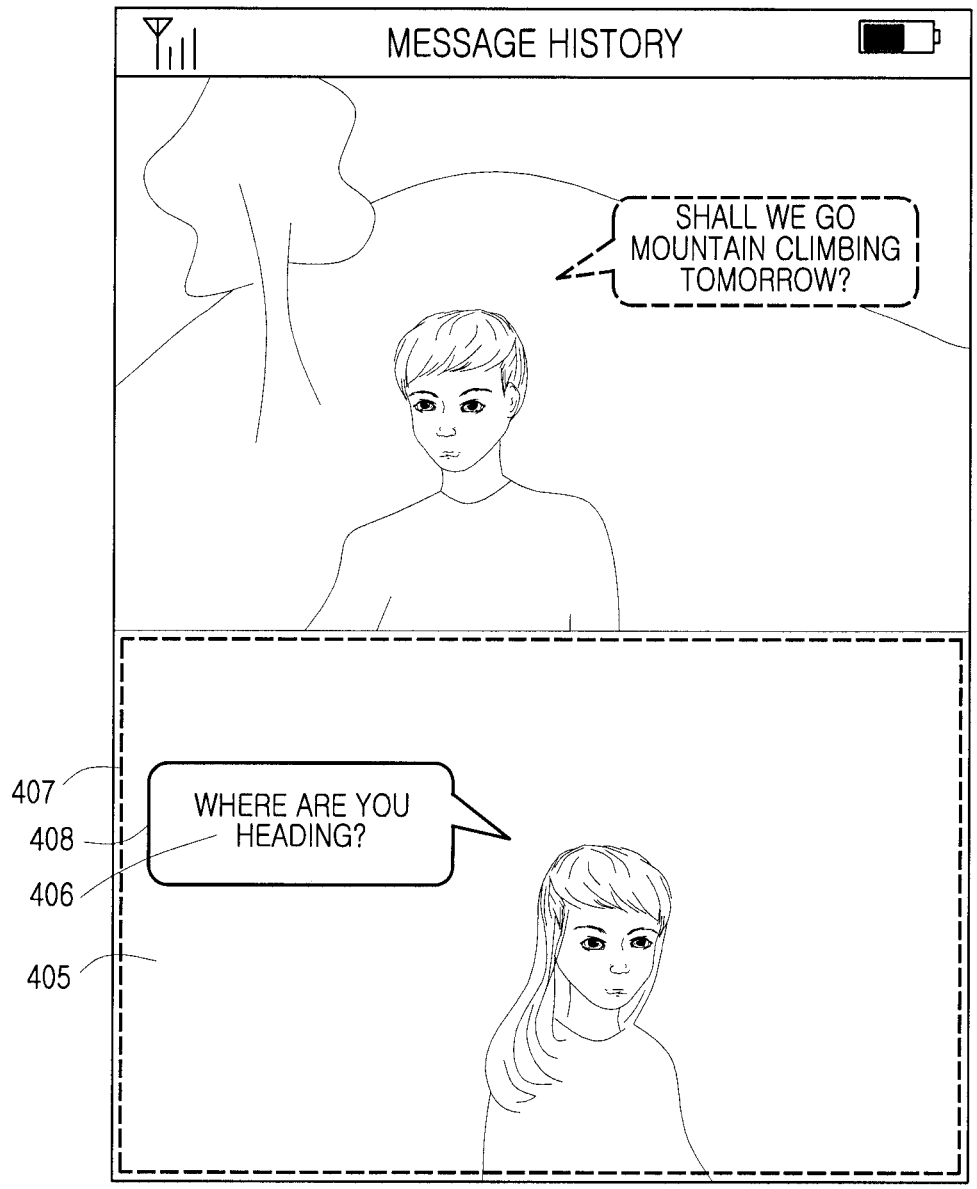

FIGS. 4A and 4B are views illustrating a screen of a mobile communication terminal where a message is displayed according to an exemplary embodiment of the present invention.

Referring to FIG. 4A, when detecting that a message is transmitted, the controller 25 finds a relevant photo image 401 according to the procedure described in FIG. 3B, and views a message history window where a message region 403 on which text 402 (Shall we go mountain climbing tomorrow?) of a calling message is displayed with the relevant photo image 401 as a background image.

Text of the message is realized in a message view region 404 in the form of a speech bubble. The size of the message view region 404 may be flexibly controlled, and the size of the text is flexibly controlled depending on the size of the message view region 404. That is, when the number of characters is small in a speech bubble of a predetermined size, the size of the text becomes large. When the number of characters is large, the text is automatically reduced, so the characters may be viewed without scrolling.

Referring to FIG. 4B, when detecting that a message is received after sending a calling message, the controller 25 views a message history window where a message region 407 on which a text 406 (Where are you heading?) of a received message is displayed with a relevant photo image 405 as a background image according to the procedure described in FIG. 3A. As illustrated, the message view region 404 of a transmission message and a message view region 408 of a received message are discriminated.

A method for displaying a message described in FIGS. 3A to 4B searches for a relevant photo image whenever a calling or received message with a another party occurs, and views a message history window where message regions on which text of a message is displayed with the searched photo image being used in a sequential manner as a background image.

Figure 5A:
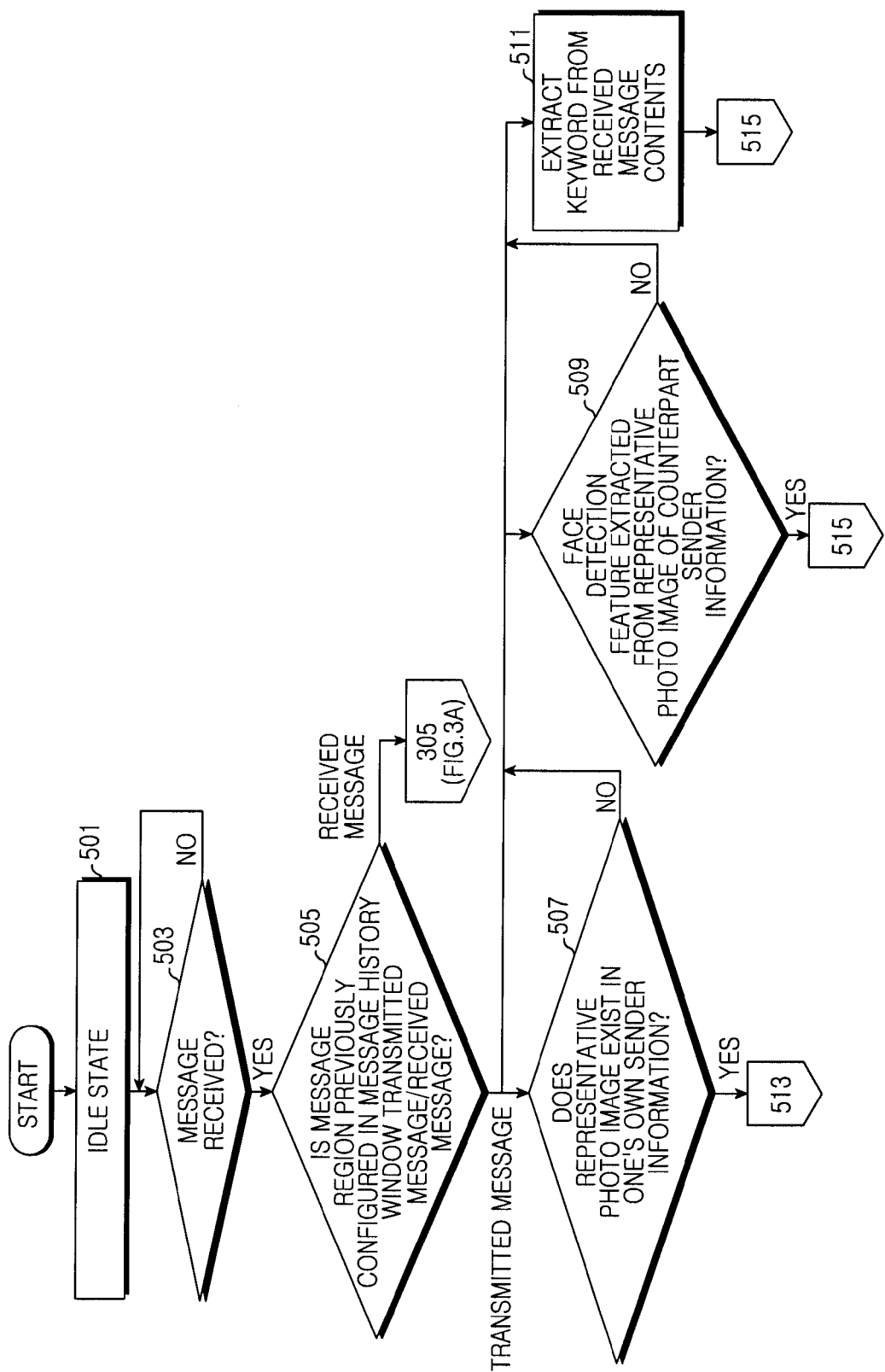
FIG. 5 is a flowchart illustrating a method for displaying a message according to an exemplary embodiment of the present invention.
Figure 5B:
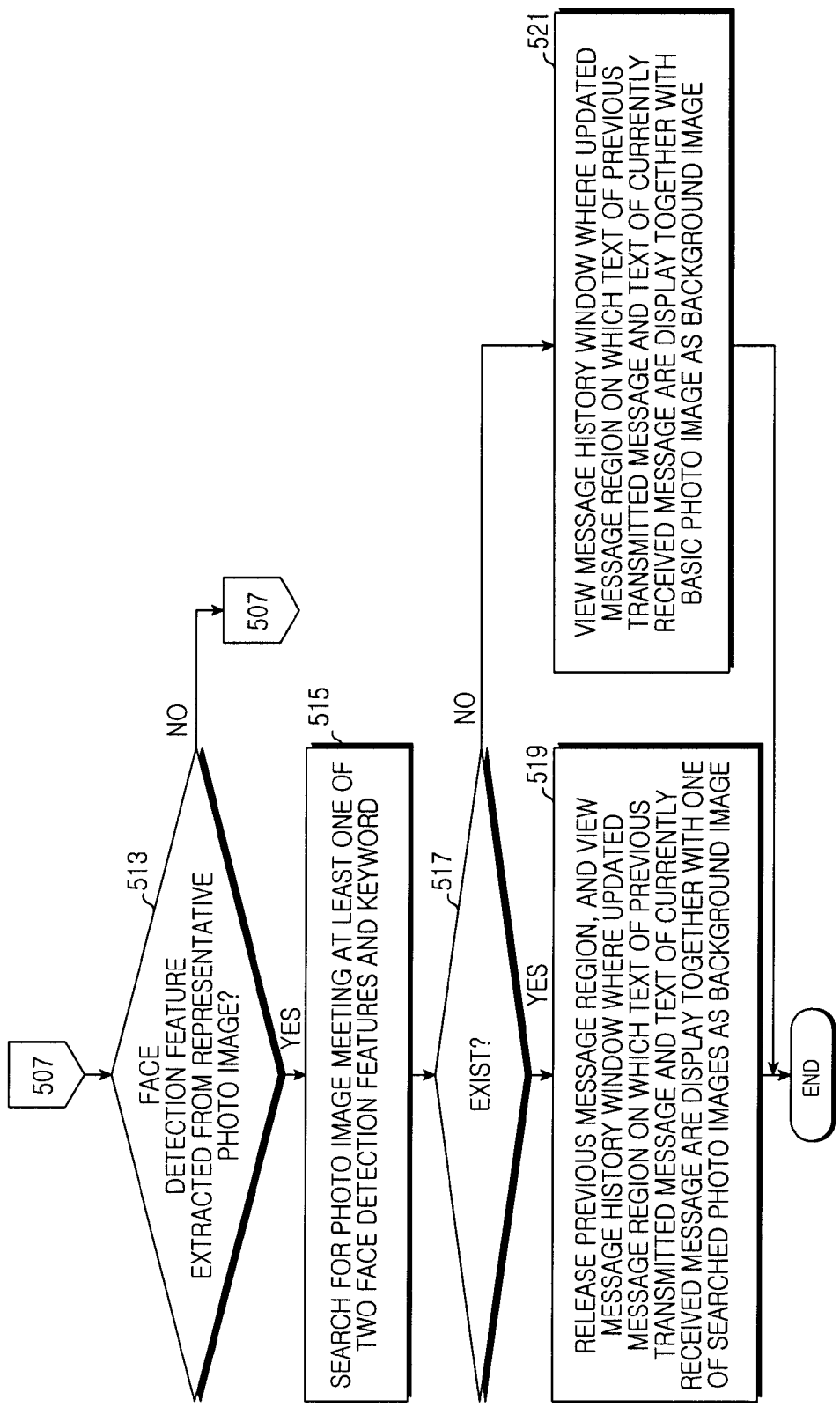

FIG. 5 is a flowchart illustrating a method for displaying a message according to an exemplary embodiment of the present invention.

Referring to FIG. 5, the controller 25 receives a message from the communication unit 24 in an idle state (step 501) in step 503.

The controller 25 determines whether a message region configured previously in a message history window corresponds to a calling message or a received message in step 505.

When the previously configured message region corresponds to a received message, the controller 25 performs a process subsequent to step 305 of FIG. 3A to search for a new relevant photo image, and views a message history window where a message region on which text of the message received in step 503 is displayed with this searched photo image being incorporated into the background image.

When the previously configured message region corresponds to a calling message, the controller 25 determines that a representative photo image, registered in advance exists, in one's sender information (step 507), and extracts a face detection feature from the representative photo image, registered in advance, (step 513). In addition, the controller 25 extracts a face detection feature from another party's representative photo image, which has been registered in advance (step 509). Furthermore, the controller 25 extracts a keyword from message contents received in step 503 (step 511). Here, when a face detection feature cannot be extracted from one's own representative photo image, the controller 25 searches for a photo image that meets the other party's face detection feature and a keyword. In addition, when a other party's representative photo image does not exist or a face detection feature cannot be extracted, even if the counterpart's representative photo image exists, the controller 25 searches for a photo image that meets the other party's face detection feature and a keyword.

Next, the controller 25 searches for a photo image that meets at least one of one's own face detection feature, an another party's face detection feature, and a keyword from an internal device or an external device.

When the photo image searched for in step 515 exists in step 517, the controller 25 releases the previous message region, selects one of the searched photo images, and views a message history window where an updated message region on which text of the previous calling message and text of the received message of step 503 are displayed together with the selected photo image as a background image in step 519. The message region is updated such that the text of the received message and the text of the calling message are displayed together with the relevant photo image as the background image is not released or updated even when a different message occurs afterward. Instead, one of the text of the received message and the text of the calling message may be deleted from the message region. In addition, the message region where the text of the one message is left may perform the process of FIG. 5.

When determining that the relevant photo image is not found in step 517, the controller 25 views a message history window where an updated message region on which text of the previous calling message and text of a currently received message are displayed with a basic photo image as a background image in step 521.

That is, an embodiment of FIG. 5 is a display method for a pair of conversation messages configured with a received message and a corresponding calling message. An example thereof is described with reference to FIGS. 6A and 6B.

Figure 6A:
FIGS. 6A and 6B are views illustrating a screen of a mobile communication terminal where a message is displayed according to an exemplary embodiment of the present invention.
Figure 6B:
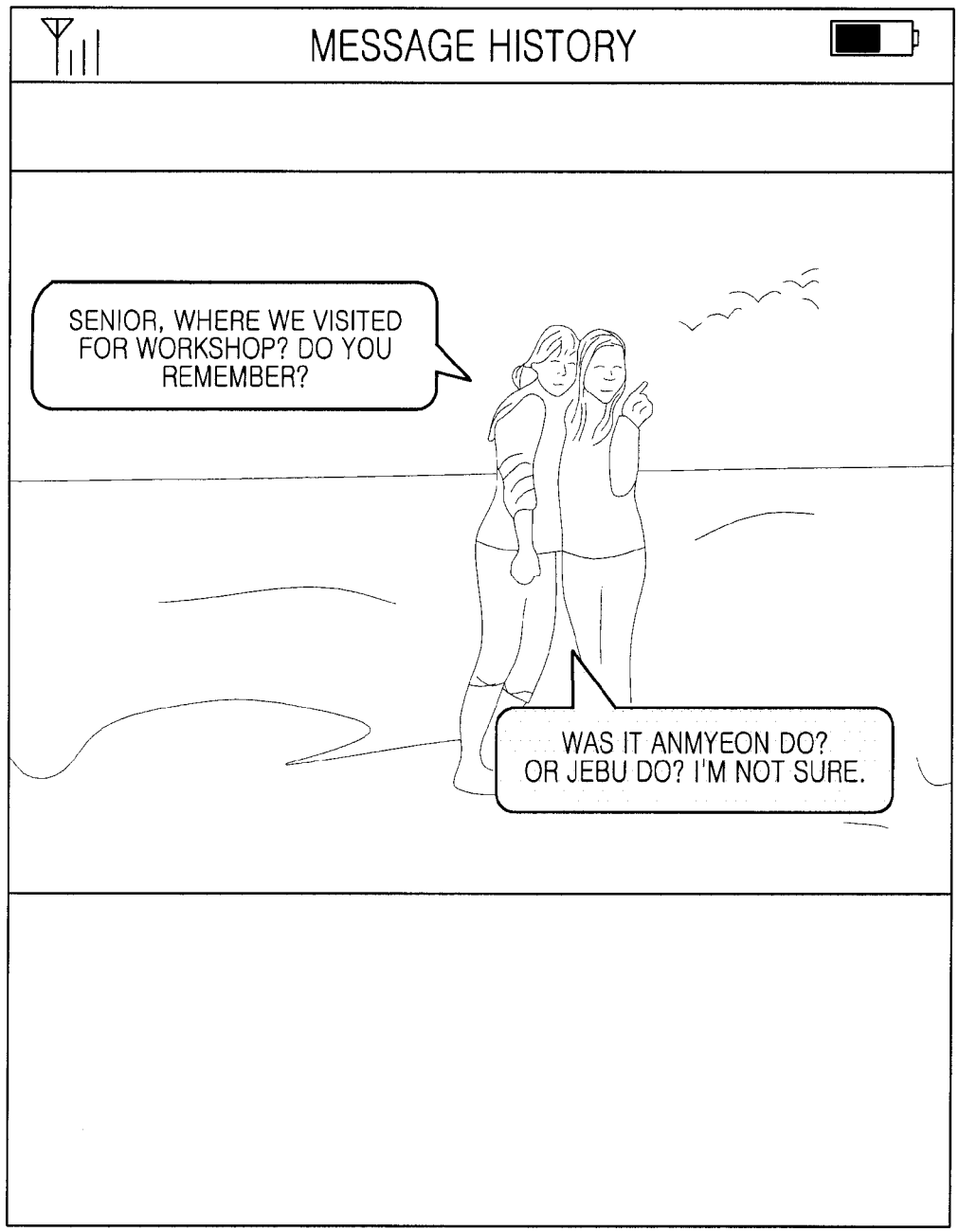

FIGS. 6A and 6B are views illustrating a screen of a mobile communication terminal where a message is displayed according to an exemplary embodiment of the present invention.

Referring to FIGS. 6A and 6B, a message history window where a message region on which text of the previously message is displayed with a relevant image as a background image may be viewed.

After that, when a received message occurs in an idle state, the controller 25 searches for a photo image that meets at least one of one's own face detection feature, another party's face detection feature, and a keyword extracted from contents of a received message. After that, the controller 25 selects one of the searched photo images, designates the selected photo image as a background image, and views a message history window where an updated message region on which text of the previous calling message and text of a received message are displayed together is configured.

When a calling message occurs in the idle state, the controller 25 performs the process of FIG. 3B to view the message history window where a relevant message region is further configured.

An embodiment of FIG. 5 shows that a second received message following the previous transmission message exist and a method for designating these two messages as a pair of messages and displaying the same. However, the embodiment is not limited thereto but applied likewise to the case where a calling message following the previous received message exists. At this point, a keyword extracted from the calling message following the previous received message becomes an object to be searched for.

Figure 7:
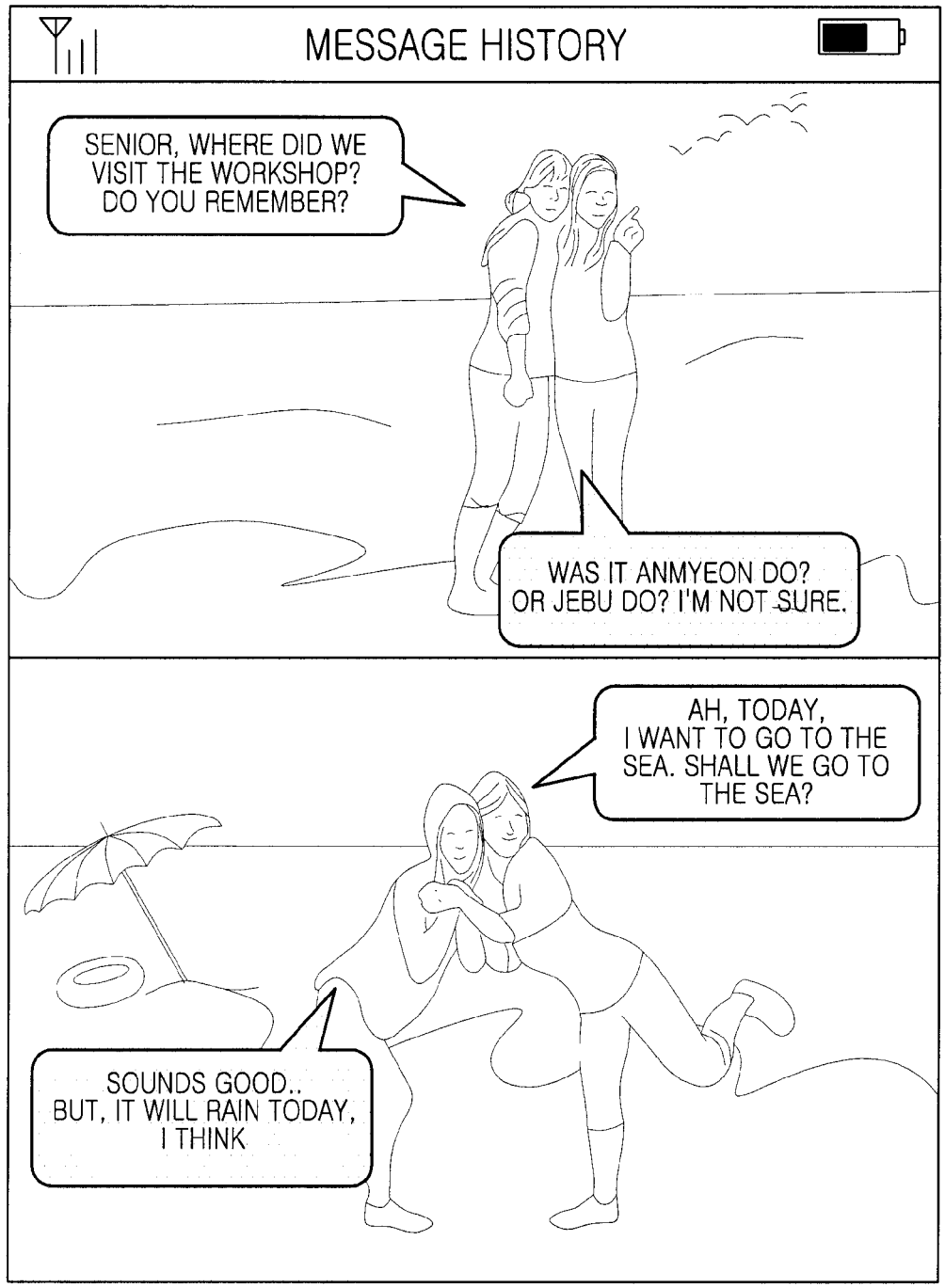
FIG. 7 is a view illustrating a screen of a mobile communication terminal that views a message displayed according to a message display method according to an exemplary embodiment of the present invention.

FIG. 7 is a view illustrating a screen of a mobile communication terminal that views a message displayed according to a message display method according to an exemplary embodiment of the present invention.

Referring to FIG. 7, a message history window may configure a plurality of message regions where a received message and a calling message form a pair and are reflected in a relevant image according to the embodiment of FIG. 5. In addition, though not shown, the message history window may include a message region where a single message is reflected, formed according to embodiments of FIGS. 3A and 3B.

Each message region is sequentially configured. For example, the latest message region may be positioned at the lowermost portion. In case of a touch screen basis, a recent message is viewed as the message region is scrolled upward.

Figure 8A:
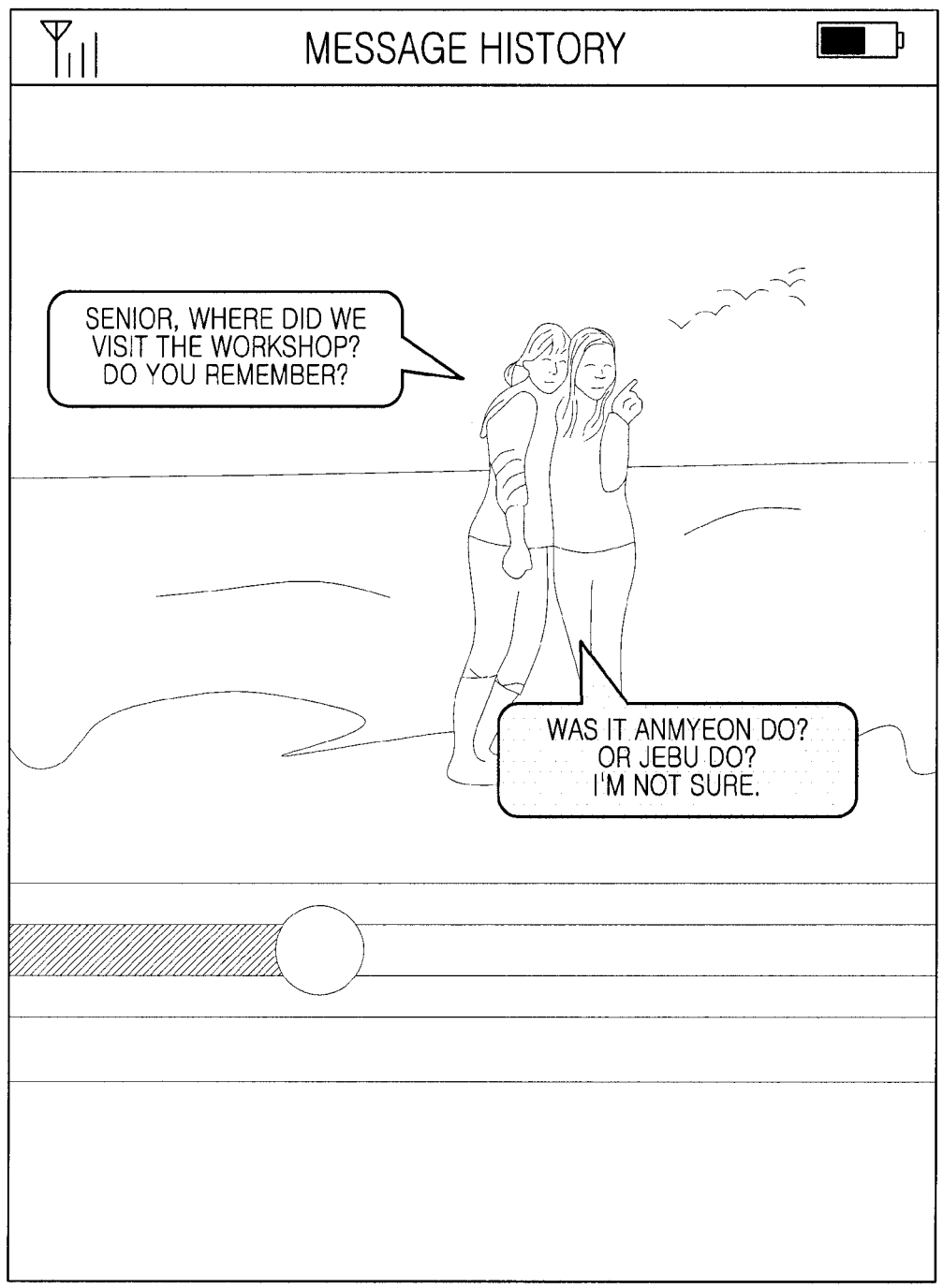
FIGS. 8A and 8B are views illustrating a screen of a mobile communication terminal that views a message displayed according to a message display method according to an exemplary embodiment of the present invention.
Figure 8B:
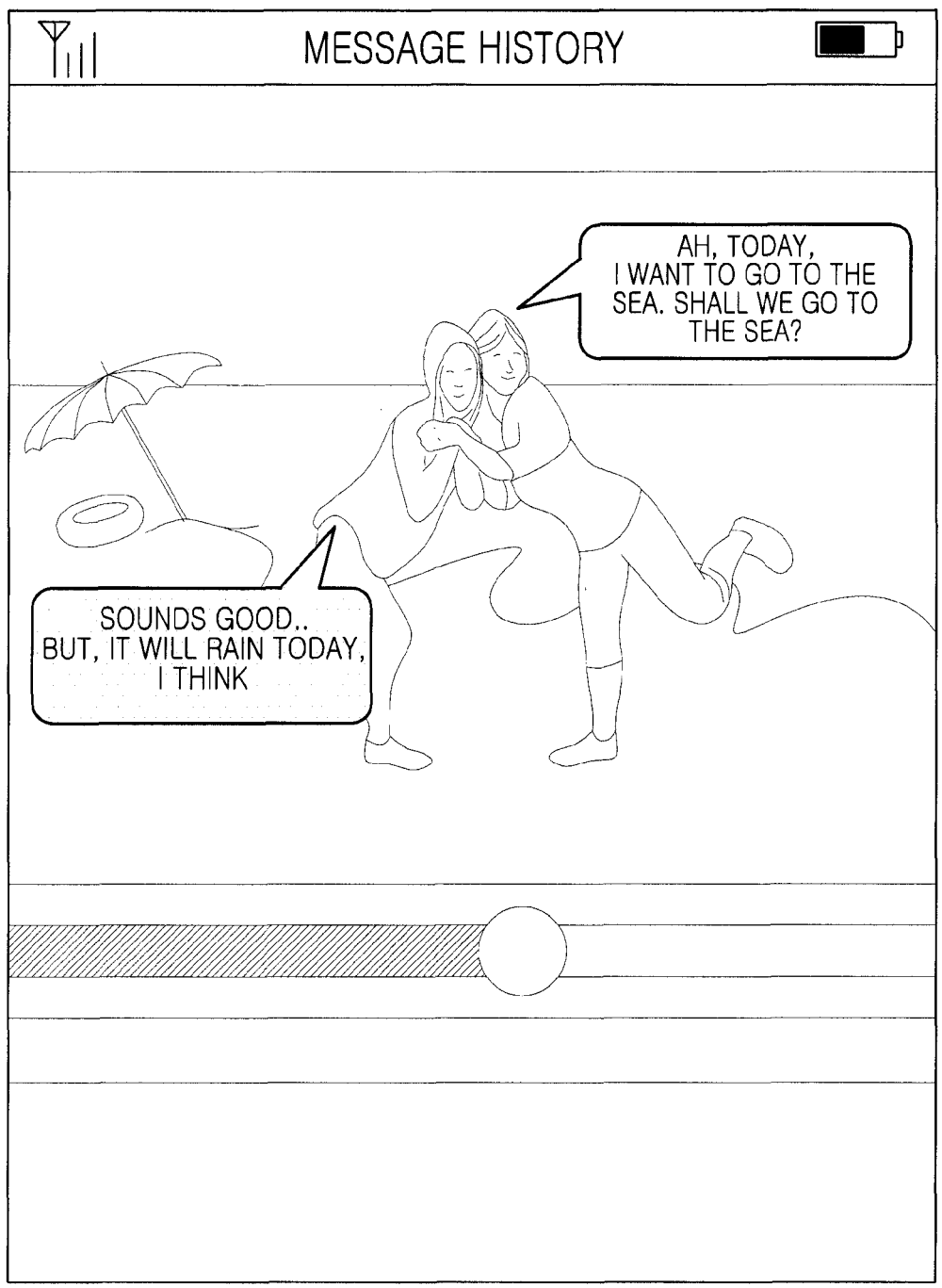

FIGS. 8A and 8B are views illustrating a screen of a mobile communication terminal that views a message displayed according to a message display method according to an exemplary embodiment of the present invention.

Referring to FIGS. 8A and 8B, a plurality of message regions sequentially configured in a message history window may be viewed in a video view method. As illustrated, from a photo image to which the previous message has been associated with to a photo image to which a recent message has been associated are sequentially viewed.

Figure 9A:
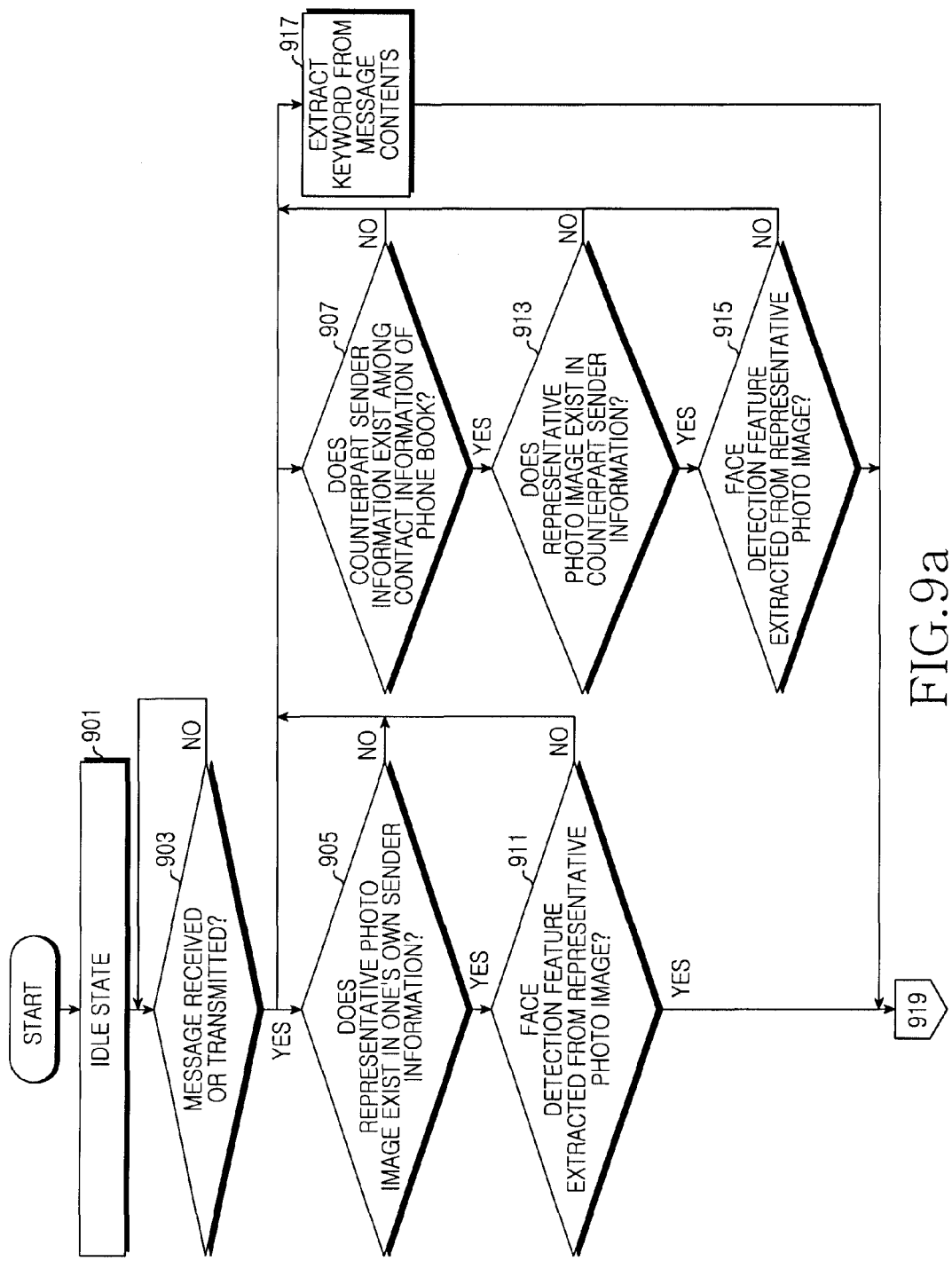
FIG. 9 is a flowchart illustrating a method for displaying a message according to an exemplary embodiment of the present invention.
Figure 9B:
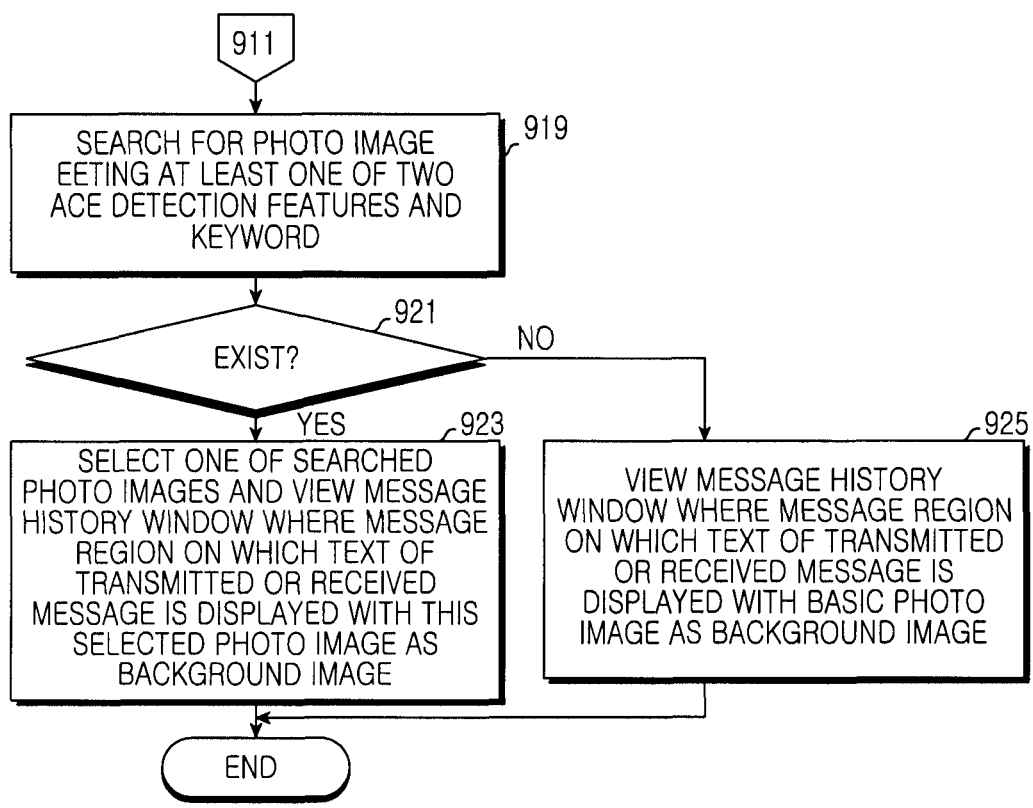

FIG. 9 is a flowchart illustrating a method for displaying a message according to an exemplary embodiment of the present invention.

Referring to FIG. 9, the controller 25 transmits/receives a message to/from a communication unit 24 while in an idle state (step 901) in step 903.

The controller 25 determines whether a representative photo image, registered in advance, exists in one's own information provided to a storage 21 (step 905), and extracts one's own face detection feature (step 911). In addition, when counterpart sender information of a received message exists among contact information inside a provided phone book (step 907), the controller 25 determines a representative photo image, registered in advance, in the counterpart sender information (step 913), and extracts the counterpart face detection feature (step 915). Furthermore, the controller 25 extracts a keyword from the received or transmitted message contents (step 917).

The controller 25 searches for a photo image that meets at least one of one's face detection feature, a counterpart's face detection feature, and a keyword from an internal device or an external device in step 919. The controller 25 may search for relevant photo images in the storage 22. In addition, the controller 25 may search for the relevant photo images using a network.

When the relevant photo images are found (step 919), the controller 25 selects one of the searched photo images, and views a message history window where a message region on which text of a transmitted or received message is displayed with this selected photo image as a background image (step 921). Here, the controller 25 may select, with priority, a photo image that meets both a face detection feature and a keyword from the searched photo images. In addition, when photo images that meet only one of the face detection feature and the keyword are searched for, the controller 25 may select, with priority, a photo image that meets the face detection feature. Furthermore, the controller 25 may select the latest photo image from the searched photo images. More particularly, when a photo image meeting a condition is immediately found during a process of searching for the photo images, the controller 25 may stop the search operation. For example, when a photo image meeting both the face detection feature and the keyword is found, the controller 25 stops the search operation.

When the relevant photo image is not found in step 917, the controller 25 views the message history window where the message region on which text of a transmission or received message is displayed with a basic photo image as a background image in step 923.

Unlike FIGS. 3A and 3B, the embodiment of FIG. 9 proposes a display method for searching for one's own photo image, a counterpart's photo image, and a photo image regarding message contents, and using this searched image as a background image of a relevant message. That is, the embodiment has used a fact that the storage 21 of the mobile communication terminal basically stores one's own sender information.

Consequently, embodiments of the present invention enhance a user's satisfaction by dynamically displaying a message.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for displaying messages in a communication terminal, the method comprising:
   receiving a first message from a far-end party;
   identifying a first image associated with the far-end party and stored in the communication terminal;
   extracting a first feature from the first image;
   identifying, by the communication terminal, a first background image by performing a first search based at least on the first feature and a keyword from the first message; and
   displaying, in a message window, the first background image together with the first message, wherein the first message is superimposed over the first background image.

2. The method of claim 1, wherein the first image is identified by using a phonebook of the communication terminal.

3. The method of claim 1, further comprising:
   transmitting a second message to the far-end party;
   updating the message window by replacing the first background image with a second background image; and
   superimposing both the first message and the second message over the second background image.

4. The method of claim 3, further comprising:
   identifying a second image associated with a user of the communication terminal and stored in the communication terminal;
   extracting a second feature from the second image; and
   performing a second search based at least on the first feature and the second feature,
   wherein the second background image is identified as a result of the second search.

5. The method of claim 4, wherein the second image is identified based on a profile of the user of the communication terminal that is stored in the communication terminal.

6. An electronic device, comprising a controller configured to:
   receive a first message from a far-end party;
   identify a first image associated with the far-end party and stored in the electronic device;
   extract a first feature from the first image;
   identify a first background image by performing a first search based at least on the first feature and a keyword from the first message; and
   display, in a message window, the first background image together with the first message, wherein the first message is superimposed over the first background image.

7. The electronic device of claim 6, wherein the first image is identified by using a phonebook of the electronic device.

8. The electronic device of claim 6, wherein the controller is further configured to:
transmit a second message to the far-end party;
update the message window by replacing the first background image with a second background image; and superimposing both the first message and the second message over the second background image.

9. The electronic device of claim 8, wherein the controller is further configured to:
identify a second image associated with a user of the electronic device and stored in the electronic device;
extract a second feature from the second image; and
perform a second search based at least on the first feature and the second feature,
wherein the second background image is identified as a result of the second search.

10. The electronic device of claim 9, wherein the second image is identified based on a profile of the user of the electronic device that is stored in a memory of the electronic device.

11. A method for displaying messages in a communication terminal, the method comprising:
transmitting a first message to a far-end party;
identifying a first image associated with a user of the communication terminal and stored in the communication terminal;
extracting a first feature from the first image;
identifying, by the communication terminal, a first background image by performing a first search based at least on the first feature and a keyword from the first message; and
displaying, in a message window, the first background image together with the first message, wherein the first message is superimposed over the first background image.

12. The method of claim 11, wherein the first image is identified based on a profile of the user of the communication terminal that is stored in the communication terminal.

13. The method of claim 11, further comprising:
receiving a second message from the far-end party;
updating the message window by replacing the first background image with a second background image; and superimposing both the first message and the second message over the second background image.

14. The method of claim 13, further comprising:
identifying a second image associated with the far-end party and stored in the communication terminal;
extracting a second feature from the second image; and
performing a second search based at least on the first feature and the second feature,
wherein the second background image is identified as a result of the second search.

15. The method of claim 14, wherein the second image is identified by using a phonebook of the communications terminal.

16. An electronic device, comprising a controller configured to:
transmit a first message to a far-end party;
identify a first image associated with a user of the electronic device and stored in the electronic device;
extract a first feature from the first image;
identify a first background image by performing a first search based at least on the first feature and a keyword from the first message; and
display, in a message window, the first background image together with the first message, wherein the first message is superimposed over the first background image.

17. The electronic device of claim 16, wherein the first image is identified based on a profile of the user of the electronic device that is stored in a memory of the electronic device.

18. The electronic device of claim 16, wherein the controller is further configured to:
receive a second message from the far-end party;
update the message window by replacing the first background image with a second background image; and superimposing both the first message and the second message over the second background image.

19. The electronic device of claim 18, wherein the controller is further configured to:
identify a second image associated with the far-end party and stored in the electronic device;
extract a second feature from the second image; and
perform a second search based at least on the first feature and the second feature,
wherein the second background image is identified as a result of the second search.

20. The electronic device of claim 19, wherein the second image is identified by using a phonebook of the electronic device.

* * * * *